United States Patent
Kwon et al.

(10) Patent No.: US 7,069,663 B2
(45) Date of Patent: Jul. 4, 2006

(54) APPARATUS AND METHOD OF CALIBRATING AZIMUTH OF MOBILE DEVICE

(75) Inventors: Woong Kwon, Seongnam-si (KR);
Kyung-shik Roh, Seongnam-si (KR);
Sang-on Choi, Suwon-si (KR);
Woo-sup Han, Yongin-si (KR);
Young-bo Shim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/987,305

(22) Filed: Nov. 15, 2004

(65) Prior Publication Data
US 2005/0160609 A1 Jul. 28, 2005

(30) Foreign Application Priority Data
Nov. 13, 2003 (KR) ............... 10-2003-0080347

(51) Int. Cl.
*G01C 17/38* (2006.01)
*G01P 21/00* (2006.01)

(52) U.S. Cl. .................................. 33/356; 702/92
(58) Field of Classification Search ............ 33/351, 33/352, 355 R, 356, 357; 324/244, 260; 702/92–94
See application file for complete search history.

(56) References Cited

U.S. PATENT DOCUMENTS

| 5,012,412 | A | * | 4/1991 | Helm ........................... 702/9 |
| 5,095,631 | A | * | 3/1992 | Gavril et al. ................ 33/356 |
| 6,606,799 | B1 | * | 8/2003 | Kato ........................... 33/356 |
| 6,836,971 | B1 | * | 1/2005 | Wan ............................ 33/356 |
| 6,860,023 | B1 | * | 3/2005 | Manfred et al. ............. 33/351 |
| 6,871,411 | B1 | * | 3/2005 | Kang et al. .................. 33/356 |
| 2004/0123474 | A1 | * | 7/2004 | Manfred et al. ............. 33/352 |

FOREIGN PATENT DOCUMENTS

| JP | 7218266 | 8/1995 |
| JP | 9304078 | 11/1997 |
| JP | 10260042 | 9/1998 |

* cited by examiner

Primary Examiner—G. Bradley Bennett
(74) Attorney, Agent, or Firm—Sughrue Mion, PLLC

(57) ABSTRACT

Provided are an apparatus and method of calibrating azimuth of a mobile device. The apparatus includes: a magnetic field measuring unit having a plurality of magnetic sensors aligned in a constant angle interval on the mobile device and measuring magnetic field data indicating magnitudes of a magnetic field in different directions; and a controller generating a calibration table indicating a correspondence between an actual magnetic field trajectory formed by the magnetic field data and a theoretical magnetic field trajectory and calibrating azimuth of the mobile device using the calibration table.

13 Claims, 5 Drawing Sheets

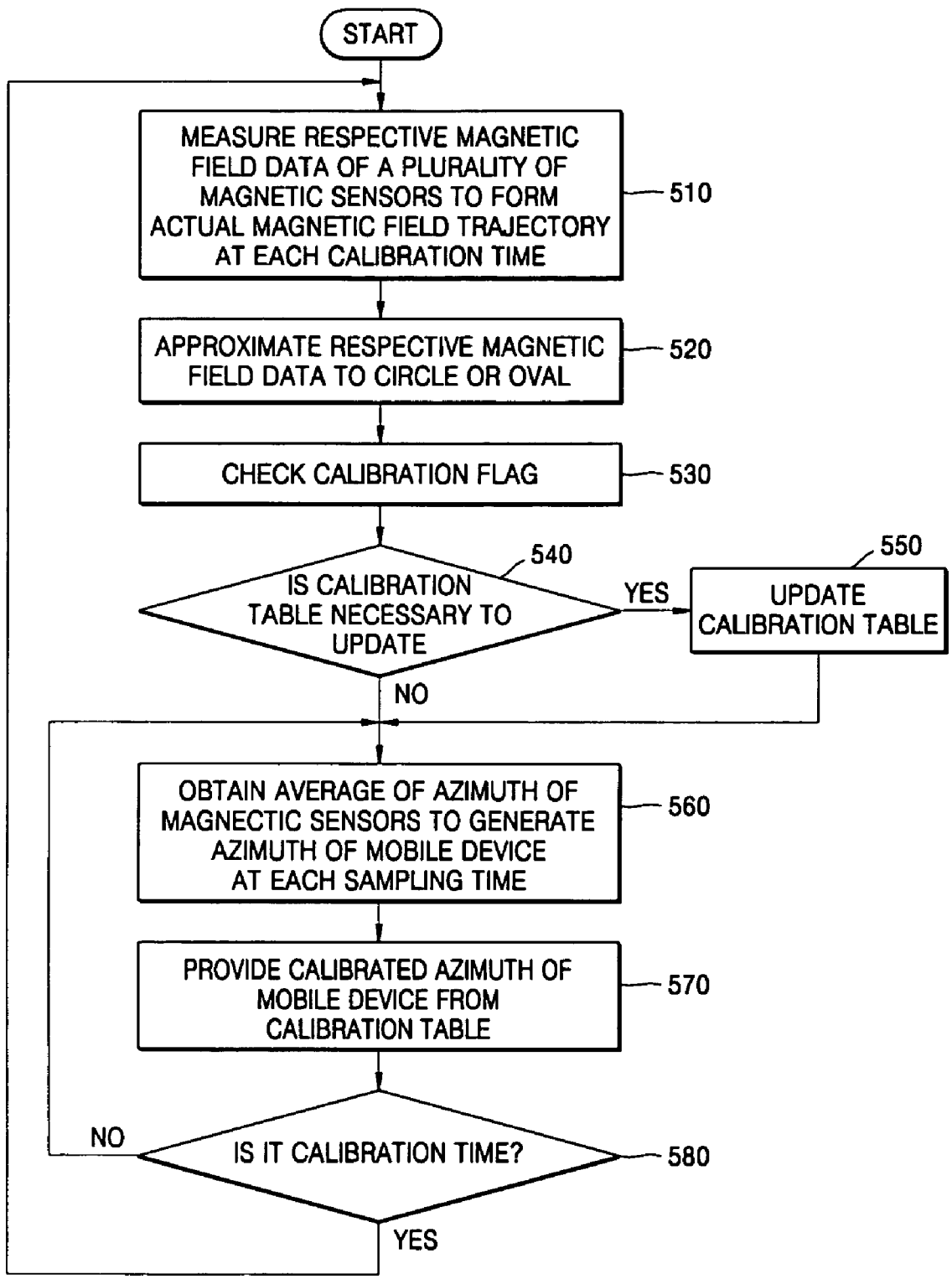

US 7,069,663 B2

APPARATUS AND METHOD OF CALIBRATING AZIMUTH OF MOBILE DEVICE

BACKGROUND OF THE INVENTION

This application claims the priority of Korean Patent Application No. 2003-80347, filed on Nov. 13, 2003, in the Korean Intellectual Property Office, the disclosure of which is incorporated herein in its entirety by reference.

1. Field of the Invention

The present invention relates to an azimuth calibration of an electronic compass, and more particularly, to an apparatus and method for calibrating an azimuth of a mobile device having an electronic compass, without rotating the mobile device.

2. Description of the Related Art

An electronic compass comprising a magnetic sensor such as a fluxgate device or a magneto-resistive device is widely used in order to recognize a heading direction of mobile devices such as intelligent vehicles, mobile robots, unattended aircrafts, and the like. However, an electronic compass has an azimuth error since a metal substance disturbs the earth's magnetic field if the metal substance is placed around the electronic compass.

To avoid an erroneous result in the heading direction of a mobile device, the rotation of the mobile device having the electronic compass is evaluated in units of time, and if the mobile device rotates 360°, magnetic field data is obtained and the azimuth error is calibrated by means of the magnetic field data. In a situation where the azimuth error is not calibrated, the mobile device will move in a wrong direction specified by an orientation value affected by the azimuth error.

SUMMARY OF THE INVENTION

The present invention provides an apparatus and method for calibrating an azimuth of a mobile device having an electronic compass by aligning a plurality of 2-axis magnetic sensors in an angle range on the mobile device, without rotating the mobile device.

According to an aspect of the present invention, there is provided an apparatus for calibrating azimuth of a mobile device, comprising: a magnetic field measuring unit having a plurality of magnetic sensors aligned in a constant angle interval on the mobile device which measures magnetic field data indicating magnitudes of a magnetic field in different directions; and a controller generates a calibration table indicating a correspondence between an actual magnetic field trajectory formed by the magnetic field data and a theoretical magnetic field trajectory, the controller calibrates azimuth of the mobile device using the calibration table.

According to another aspect of the present invention, there is provided a method of calibrating azimuth of a mobile device, comprising: measuring magnetic field data indicating magnitudes of a magnetic field in different directions using a plurality of magnetic sensors aligned in a constant angle interval on the mobile device and forming an actual magnetic field trajectory using the magnetic field data; generating a calibration table indicating a correspondence between the actual magnetic field trajectory formed by the magnetic field data and a theoretical magnetic field trajectory; and calibrating azimuth of the mobile device using the calibration table.

According to still another aspect of the present invention, there is provided a computer readable medium having recorded thereon a computer program for performing the method of calibrating azimuth of a mobile device.

BRIEF DESCRIPTION OF THE DRAWINGS

The above and other features and advantages of the present invention will become more apparent by describing in detail exemplary embodiments thereof with reference to the attached drawings in which:

FIG. 5 is a flow chart for explaining a method of calibrating azimuth of a mobile device according to an embodiment of the present invention.

DETAILED DESCRIPTION OF THE INVENTION

Hereinafter, the present invention will now be described more fully with reference to the accompanying drawings, in which embodiments of the invention are shown.

Figure 1:
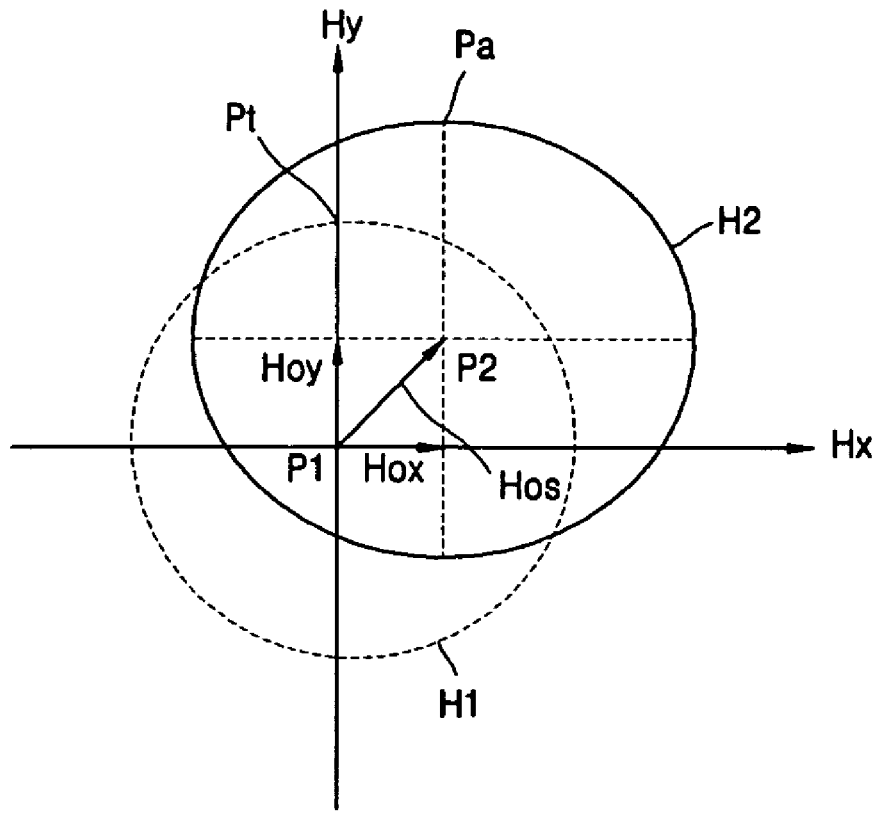
FIG. 1 shows a magnetic field trajectory formed with the rotation of 360° of the mobile device having two magnetic filed sensors which are disposed orthogonal to each other.

FIG. 1 is a magnetic field trajectory formed with the rotation of 360° of the mobile device having two magnetic field sensors which are disposed orthogonal to each other. In a linear magnetic flux environment where only the Earth's magnetic field exists, the magnetic field trajectory which is obtained by projecting the magnetic field data sensed by the magnetic field sensors on a two-dimensional plane is a complete circle analogous to H1 in FIG. 1. In a curved magnetic flux environment where an external magnetic field coexists with the Earth's magnetic field, disturbance of a magnetic field occurs. As a result, the magnetic field trajectory is a distorted circle analogous to H2 in FIG. 1 in which the center of the circle moves from P1 to P2 due to an offset magnetic field Hos. The offset magnetic field Hos is divided into an x-axis and a y-axis, i.e., an x-axis offset component Hox and a y-axis offset component Hoy. The azimuth of the compass corresponds to an angle at which coordinates on the circle correlate to either the x-axis or the y-axis.

Figure 2:
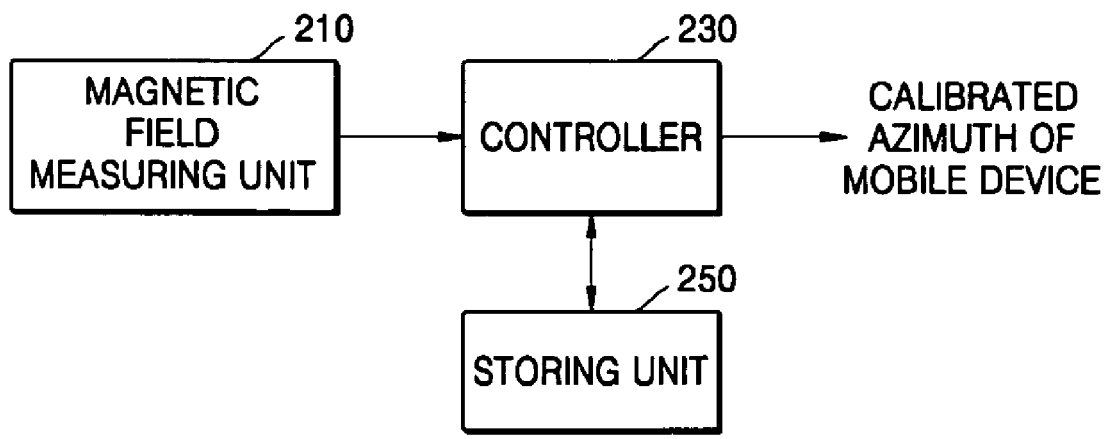
FIG. 2 is a block diagram of an apparatus for calibrating azimuth of a mobile device according to an embodiment of the present invention.

FIG. 2 is a block diagram of an apparatus for calibrating azimuth of a mobile device according to an embodiment of the present invention. The apparatus comprises a magnetic field measuring unit 210, a controller 230, and a storing unit 250.

Referring to FIG. 2, in the magnetic field measuring unit 210, a plurality of 2-axis magnetic sensors such as fluxgate devices or magneto-resistive devices is aligned in a predetermined angle interval on a mobile device and at least three magnetic sensors may be used. This alignment results in a similar effect of rotating 360° a mobile device having two magnetic sensors which are disposed orthogonal to each other. As an alternative to of this alignment, a multi-axis magnetic sensor integrated on one chip may be used. At each calibration time, the magnetic field measuring unit 210 measures magnetic field data indicating magnitudes of a magnetic field in different directions according to the angle interval in which the magnetic sensors are aligned to form an actual magnetic field trajectory and provides the measured magnetic field data to the controller 230.

The controller 230 stores a theoretical magnetic field trajectory analogous to H1 of FIG. 1 obtained from the magnetic field measuring unit 210 under the environment of a linear flux. The controller 230 forms an actual magnetic field trajectory like H2 of FIG. 1 using magnetic field data having a constant angle interval and simultaneously obtained from the magnetic field measuring unit 210 over 360°. The actual magnetic field trajectory is obtained by projecting the magnetic field data generated from each of at least three magnetic sensors on a two-dimensional plane and approximating the projected coordinates on the two-dimensional plane aligned on a circle or an oval. The controller 230 generates a calibration table in which each of the coordinates on the actual magnetic field trajectory corresponds to a respective coordinate on the theoretical magnetic field trajectory or a calibration parameter capable of realizing one-to-one correspondence between the actual magnetic field trajectory and the theoretical magnetic field trajectory and stores the calibration table or the calibration parameter in the storing unit 250. The calibration table or the calibration parameter may be updated at each calibration time. Alternatively, update of the calibration table or the calibration parameter may be determined depending on the accumulated number of the calibration time in which an offset magnetic field obtained at the calibration time is more than a predetermined threshold. After approximating the actual magnetic field trajectory aligned on a circle or oval, a determination is made as to whether update of the calibration table or the calibration parameter is necessary by comparing an error average for respective magnetic sensors with a predetermined threshold. For example, if the determination reveals that update of the calibration table or the calibration parameter during a current calibration time is necessary, azimuths of the mobile device obtained from the magnetic field measurement unit 210 at each sampling time are calibrated using an updated calibration table or an updated calibration parameter until reaching a subsequent calibration time. As a result, a calibrated azimuth of the mobile device is outputted. Meanwhile, if the determination reveals that update of the calibration table or the calibration parameter during a current calibration time is necessary, azimuths of the mobile device obtained from the magnetic field measurement unit 210 at each sampling time are calibrated using the calibration table or the calibration parameter used in a previous calibration time until reaching a subsequent calibration time. As a consequence, a calibrated azimuth of the mobile device is outputted.

The calibration table makes azimuth Pt obtained from a theoretical magnetic field trajectory analogous to H1 in FIG. 1 correspond to azimuth Pa obtained from an actual magnetic field trajectory analogous to H2 in FIG. 1. Meanwhile, the calibration table may be replaced with a calibration parameter and the calibration parameter according to an embodiment of the present invention may be $A_x$, $H_{ox}$, $A_y$, $H_{oy}$ in Equation 1 as shown below.

$$H_{cx} = \frac{H_x - H_{ox}}{A_x}, \quad H_{cy} = \frac{H_y - H_{oy}}{A_y} \quad \text{[Equation 1]}$$

Herein, $H_{cx}$, $H_{cy}$ are respectively an x component and a y component of a theoretical magnetic field trajectory; $H_x$, $H_y$ are respectively an x component and a y component of an actual magnetic field trajectory; $H_{ox}$, $H_{oy}$ are respectively an x component and a y component of an offset magnetic field; $A_x$, $A_y$ are respectively an x component and a y component of a difference value between the minimum value obtained from an actual magnetic field trajectory and the maximum value obtained from an actual magnetic field trajectory. Calibrated azimuth can be obtained in $$\arctan\left(\frac{H_{cx}}{H_{cy}}\right)$$

from Equation 1.

Figure 3:
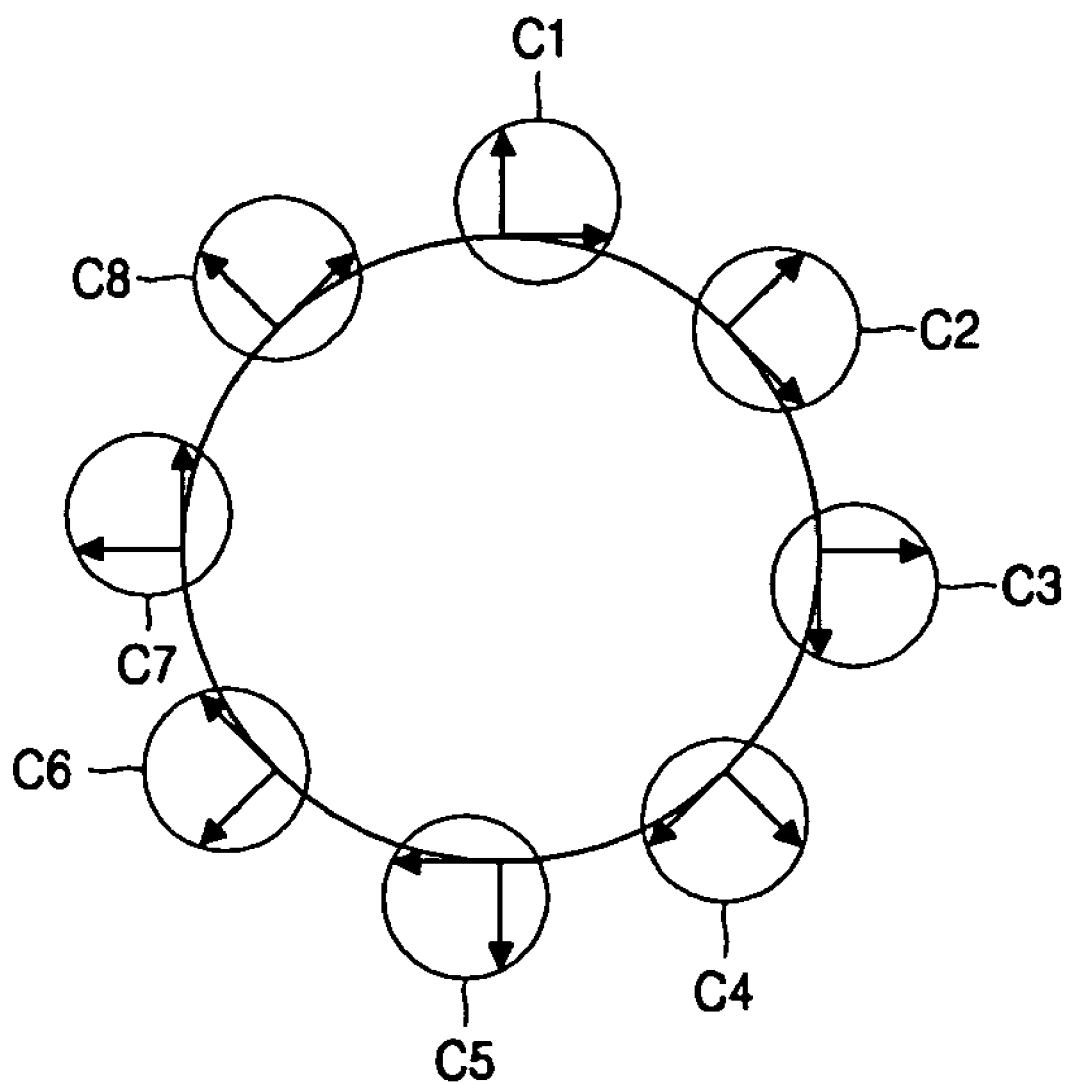
FIG. 3 is a view showing an exemplary embodiment of the magnetic field measuring unit displayed in FIG. 2.

FIG. 3 is a view showing an exemplary embodiment of the magnetic field measuring unit 210 displayed in FIG. 2. Eight magnetic sensors C1~C8 are aligned on a circle in an angle interval of 45°. The magnetic sensors C1~C8 output magnetic field data each corresponding to rotation angles, 0°, 45°, 90°, 135°, 180°, 225°, 270°, and 315°. An actual magnetic field trajectory analogous to H2 of FIG. 1 is formed using an X-axis component Hx of magnetic field intensity and a Y-axis component Hy of magnetic field intensity obtained from the magnetic field data.

Figure 4A:
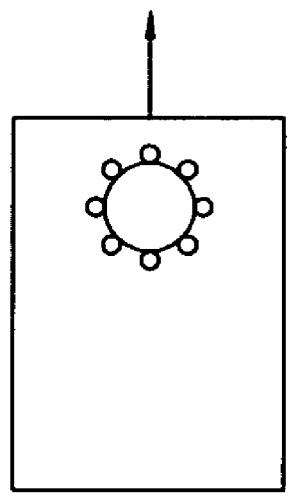
FIGS. 4A and 4B are views showing examples of installing a plurality of magnetic sensors in the magnetic field measuring unit of FIG. 2.
Figure 4B:
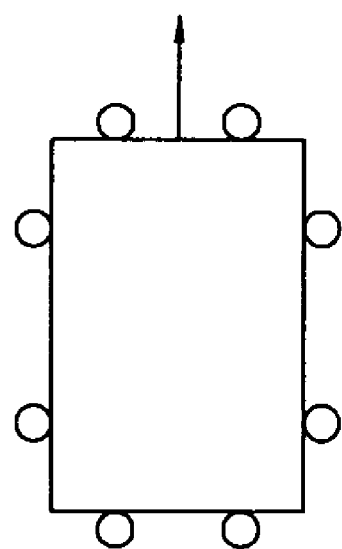

FIGS. 4A and 4B are views showing examples of installing a plurality of magnetic sensors in the magnetic field measuring unit 210 of FIG. 2. FIG. 4A illustrates an example of aligning a plurality of magnetic sensors in a single unit at a specific location inside a mobile device, and FIG. 4B illustrates an example of aligning a plurality of magnetic sensors on the outer surface of a mobile device.

FIG. 5 is a flow chart for explaining a method of calibrating azimuth of a mobile device according to an embodiment of the present invention, which will now be described with reference to FIGS. 1 to 3.

In operation 510, the magnetic field measuring unit 210 measures magnetic field data obtained from a plurality of magnetic sensors which indicates magnitudes of a magnetic field in different directions over 360° at each calibration time. In operation 520, an actual magnetic field trajectory from magnetic field data measured in operation 510 is approximated and is aligned on a circle or oval.

In operation 530, a calibration flag is checked by using an X-axis offset component Hox and a Y-axis offset component Hoy of an offset magnetic field Hos obtained from an actual magnetic field trajectory and a theoretical magnetic field trajectory and count values accumulated by a previous calibration time. Operation 530 will be described later with reference to FIG. 6.

In operation 540, it is determined whether update of a calibration table or a calibration parameter is necessary by referring to the calibration flag. When update of the calibration table or the calibration parameter is necessary, i.e., when the calibration flag is 1, in operation 550, the calibration table is updated at the current calibration time and the updated calibration table is stored in the storing unit 250.

In operation 560, azimuth of the mobile device is measured by averaging magnetic field data provided from a plurality of magnetic sensors in the magnetic field measuring unit 210 at each sampling time. The azimuth of the mobile device is influenced by the Earth's magnetic field and an external magnetic field.

In operation 570, a calibrated azimuth of the mobile device corresponding to the azimuth obtained from operation 560 is outputted. The calibrated azimuth is obtained by referring to a calibration table or a calibration parameter stored in the storing unit 250 and used in a previous calibration time or a calibration table or a calibration parameter updated from operation 550. The calibrated azimuth of the mobile device is only influenced by the Earth's magnetic field.

In operation 580, it is determined whether a subsequent calibration time has been reached. When a subsequent calibration time is reached, the routine returns to operation 510. Alternatively, when a subsequent calibration time has not been reached, the routine returns to operation 560.

Figure 6:
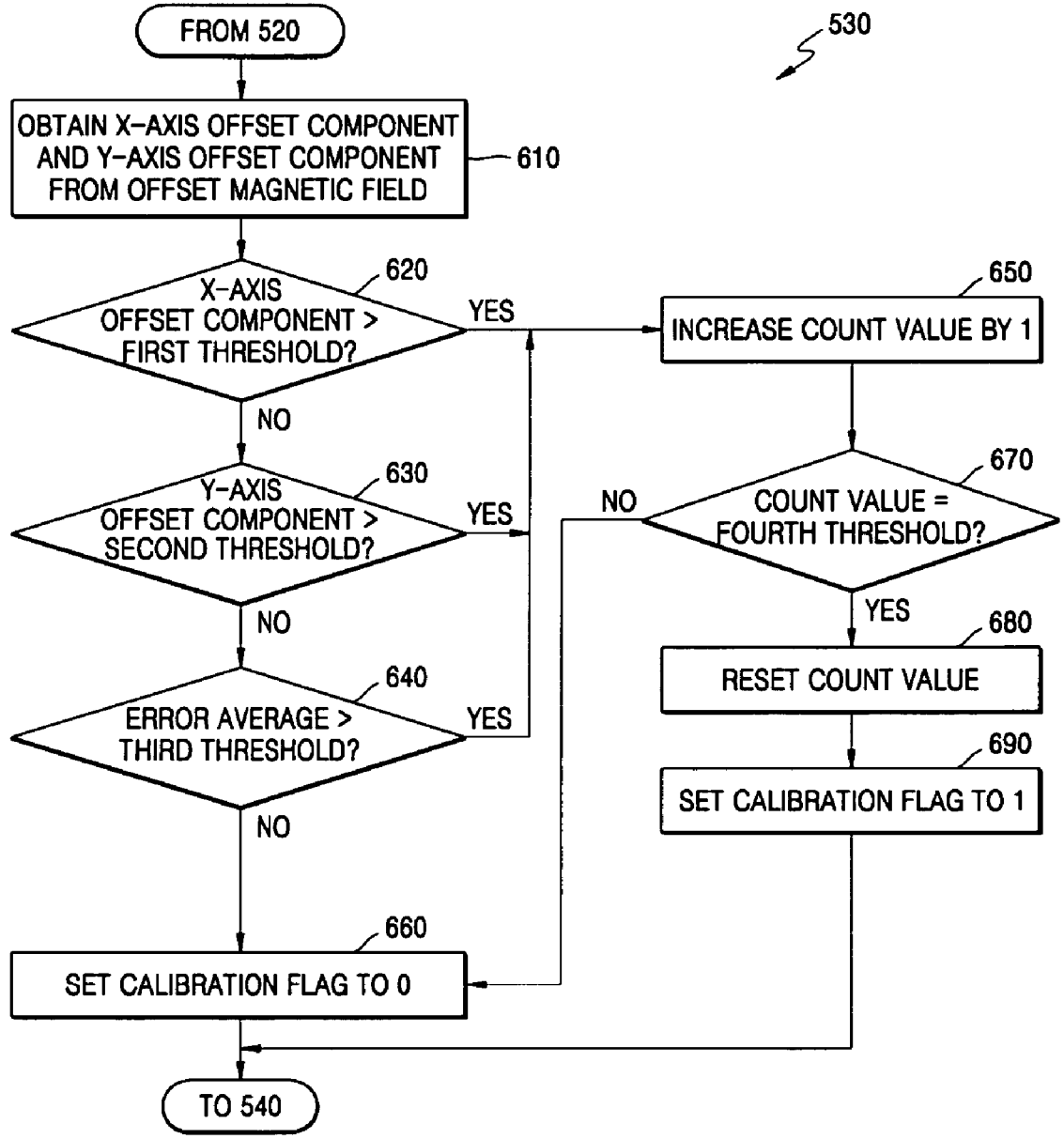
FIG. 6 is a flow chart for explaining operation 530 of FIG. 5.

FIG. 6 is a flow chart for explaining operation 530 of FIG. 3

In operation 610, an offset magnetic field Hos is obtained from an actual magnetic field trajectory analogous to H2 of FIG. 1 formed by a plurality of magnetic sensors in the magnetic field measuring unit 210 and a theoretical magnetic field trajectory analogous to H1 of FIG. 1. Additionally, an X-axis offset component Hox and a Y-axis offset component Hoy of the offset magnetic field Hos are obtained.

In operation 620, the X-axis offset component Hox is compared with a first threshold Th1. When the X-axis offset component Hox is less than or the same as the first threshold Th1, operation 630 is performed. When the X-axis offset component Hox is more than the first threshold Th1, a count value increases by 1 in operation 650. The count value indicates an accumulated number of a calibration time at which it is determined that at least one of the X-axis offset component Hox and the Y-axis offset component Hoy is larger than a corresponding threshold or the error average due to approximation of the actual magnetic field trajectory is larger than a predetermined threshold.

In operation 630, the Y-axis offset component Hoy is compared with a second threshold Th2. When the Y-axis offset component Hoy is less than or the same as the second threshold Th2, operation 640 is performed. When the Y-axis offset component Hoy is more than the second threshold Th2, a count value increases by 1 in operation 650.

In operation 640, an average of errors caused by approximating the actual magnetic field trajectory aligned on a circle or an oval is compared with a third threshold Th3. Distances between location values determined by the X-axis magnetic field component Hx and the Y-axis magnetic field component Hy of magnetic field data from each of the magnetic sensors and location values on an approximated circle or oval are set to errors. Every error is summed up and is divided by the number of magnetic sensors to obtain an average of errors. When the average of errors is less than or the same as the third threshold Th3, a calibration flag is set to 0 in operation 660. When the average of errors is more than the third threshold Th3, a count value increases by 1 in operation 650.

In operation 670, the count value obtained from operation 650 is compared with a fourth threshold Th4. When the count value is the same as the fourth threshold Th4, the count value is reset in operation 680, and the calibration flag is set to 1 in operation 690.

When the X-axis offset component Hox is more than the first threshold Th1, the Y-axis offset component Hoy is more than the second threshold Th2, or the average of errors is more than the third threshold Th3, 1 is added to the count value. When the count value is the same as a fourth threshold Th4, a previous calibration table or a previous calibration parameter is updated to obtain a calibrated azimuth of a mobile device using an updated calibration table or an updated calibration parameter. When the X-axis offset component Hox is less than or the same as the first threshold Th1, the Y-axis offset component Hoy is less than or the same as the second threshold Th2 and the average of errors is less than or the same as the third threshold Th3, a calibrated azimuth of a mobile device is obtained using a previous calibration table or a previous calibration parameter. Optionally, the average of errors caused by approximating to a circle or an oval may be compared with the third threshold Th3.

According to yet another exemplary embodiment of the present invention, there is provided a computer readable medium having recorded thereon a computer readable program for performing the method of calibrating azimuth of a mobile device. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, azimuth of a mobile device having an electronic compass can be calibrated by aligning a plurality of 2-axis magnetic sensors on the mobile device, without rotating the mobile device. Consequently, it is possible to calibrate azimuth of the mobile device even when the mobile device does not move or rotate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for calibrating azimuth of a mobile device, comprising:
   a magnetic field measuring unit having a plurality of magnetic sensors aligned in a constant angle interval on the mobile device, and measuring magnetic field data indicating magnitudes of a magnetic field in different directions; and
   a controller generating a calibration parameter indicating a correspondence between an actual magnetic field trajectory formed by the magnetic field data and a theoretical magnetic field trajectory and calibrating azimuth of the mobile device using the calibration parameter, wherein the calibration parameter includes a magnetic field magnitude component and an offset component.

2. The apparatus of claim 1, wherein the calibration parameter is updated at each calibration time.

3. The apparatus of claim 1, wherein the calibration parameter is updated when an accumulated number, obtained at each calibration time, is a value which equals a predetermined threshold.

4. The apparatus of claim 3, wherein the value is increased and compared to the predetermined threshold when it is determined that an X-axis offset component of the actual magnetic field trajectory formed at each calibration time is larger than a first threshold or a Y-axis offset component of the actual magnetic field trajectory formed at each calibration time is larger than a second threshold.

5. The apparatus of claim 3, wherein the value equals the predetermined threshold when it is determined that an X-axis offset component of the actual magnetic field trajectory formed at each calibration time is larger than a first threshold or a Y-axis offset component of the actual magnetic field trajectory formed at each calibration time is larger than a second threshold or an average of errors caused by approximating the actual magnetic field trajectory is larger than a third threshold.

6. The apparatus of claim 1, wherein the plurality of magnetic sensors are disposed inside the mobile device.

7. The apparatus of claim 1, wherein the plurality of magnetic sensors are disposed on an outer surface of the mobile device.

8. A method of calibrating azimuth of a mobile device, comprising:

measuring magnetic field data indicating magnitudes of a magnetic field in different directions using a plurality of magnetic sensors aligned in a constant angle interval on the mobile device and forming an actual magnetic field trajectory using the magnetic field data;

generating a calibration parameter indicating a correspondence between the actual magnetic field trajectory formed by the magnetic field data and a theoretical magnetic field trajectory, wherein the calibration parameter includes a magnetic field magnitude component and an offset component; and calibrating azimuth of the mobile device using the calibration parameter.

9. The method of claim 8, wherein the calibration parameter is updated at each calibration time.

10. The method of claim 8, wherein the calibration parameter is updated when an accumulated number, obtained at each calibration time, is a value which equals a predetermined threshold.

11. The method of claim 10, wherein the value is increased and compared to the predetermined threshold when it is determined that an X-axis offset component of the actual magnetic field trajectory formed at each calibration time is larger than a first threshold or a Y-axis offset component of the actual magnetic field trajectory formed at each calibration time is larger than a second threshold.

12. The method of claim 10, wherein the value is increased and compared to the predetermined threshold when it is determined that an X-axis offset component of the actual magnetic field trajectory formed at each calibration time is larger than a first threshold or a Y-axis offset component of the actual magnetic field trajectory formed at each calibration time is larger than a second threshold or an average of errors caused by approximating the actual magnetic field trajectory is larger than a third threshold.

13. A computer readable medium having recorded thereon a computer readable program for performing a method of calibrating azimuth of a mobile device, comprising:

measuring magnetic field data indicating magnitudes of a magnetic field in different directions using a plurality of magnetic sensors aligned in a constant angle interval on the mobile device and forming an actual magnetic field trajectory using the magnetic field data;

generating a calibration parameter between the actual magnetic field trajectory formed by the magnetic field data and a theoretical magnetic field trajectory, wherein the calibration parameter includes a magnetic field magnitude component and an offset component; and calibrating azimuth of the mobile device using the calibration parameter.

* * * * *